United States Patent
Wang et al.

(10) Patent No.: US 7,282,294 B2
(45) Date of Patent: *Oct. 16, 2007

(54) HYDROGEN STORAGE-BASED RECHARGEABLE FUEL CELL SYSTEM AND METHOD

(75) Inventors: Tony Wang, Shanghai (CN); Chang Wei, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 378 days.

This patent is subject to a terminal disclaimer.

(21) Appl. No.: 10/882,313

(22) Filed: Jul. 2, 2004

(65) Prior Publication Data

US 2006/0003203 A1    Jan. 5, 2006

(51) Int. Cl.
*H01M 8/18* (2006.01)
*H01M 4/90* (2006.01)
*H01M 8/08* (2006.01)

(52) U.S. Cl. ............... 429/44; 429/17; 429/40; 429/46

(58) Field of Classification Search ............ None
See application file for complete search history.

(56) References Cited

U.S. PATENT DOCUMENTS

| | | | | |
|---|---|---|---|---|
| 4,465,580 A | * | 8/1984 | Kasuya | 204/290.12 |
| 4,839,247 A | * | 6/1989 | Levy et al. | 429/21 |
| 5,376,470 A | * | 12/1994 | Sprouse | 429/19 |
| 5,589,285 A | * | 12/1996 | Cable et al. | 429/13 |
| 2002/0017463 A1 | * | 2/2002 | Merida-Donis | 204/551 |
| 2002/0079235 A1 | * | 6/2002 | Molter et al. | 205/746 |
| 2003/0190507 A1 | * | 10/2003 | Docter et al. | 429/20 |
| 2004/0009121 A1 | * | 1/2004 | Jensen et al. | 423/648.1 |
| 2004/0101740 A1 | * | 5/2004 | Sanders | 429/40 |
| 2005/0136312 A1 | * | 6/2005 | Bourgeois et al. | 429/32 |

FOREIGN PATENT DOCUMENTS

| | | |
|---|---|---|
| GB | 1276260 | 6/1972 |
| JP | 05242906 | 9/1993 |
| JP | 06223887 | 8/1994 |
| JP | 2002184474 | 6/2002 |

OTHER PUBLICATIONS

A.A. Mohamad, et al "$Mg_2Ni$ Hydrogen Storage Alloys for Metal Hydride-Air Cell", (2003), Journal of New Materials for Electrochemical Systems, vol. 6, pp. 205-210.

* cited by examiner

*Primary Examiner*—Jonathan Crepeau
*Assistant Examiner*—Tony Chuo
(74) *Attorney, Agent, or Firm*—Shawn A. McClintic; William E. Powell, III

(57) ABSTRACT

A dual mode electrochemical system comprises a first electrode capable of storing hydrogen, a second electrode, a substantially electrically insulating and substantially ionically conducting membrane interposed therebetween and an electrolyte. In a first mode, upon introduction of water and electricity the dual mode electrochemical system electrolyzes the water in the presence of the electrolyte and produces hydrogen and oxygen across the membrane. The hydrogen is stored in the first electrode. In a second mode, upon introduction of an oxidant to the second electrode the dual mode electrochemical system produces water and electricity by reacting the stored hydrogen and the oxidant across the membrane.

22 Claims, 4 Drawing Sheets

Fig. 2

Charge Mode:
Anode: $4M + 4H_2O + 4e \longrightarrow 4MH + 4OH^-$ (R1)
Cathode: $4OH^- \longrightarrow O_2 + 2H_2O + 4e$ (R2)

Discharge Mode:
Anode: $4MH + 4OH^- \longrightarrow 4M + 4H_2O + 4e$ (R3)
Cathode: $O_2 + 2H_2O + 4e \longrightarrow 4OH^-$ (R4)

Overall reaction: $H_2O \underset{\text{Metal hydride}}{\overset{\text{Electricity}}{\rightleftarrows}} H_2O$ (R5)

HYDROGEN STORAGE-BASED RECHARGEABLE FUEL CELL SYSTEM AND METHOD

BACKGROUND OF THE INVENTION

The present invention relates generally to the field of electrochemical systems. More particularly, the present invention relates to dual mode electrochemical systems that can produce hydrogen in a form of hydride and electrical energy.

Fuel cell technology has the potential to significantly reduce harmful emissions. Fuel cells are capable of efficient energy conversion and can be used in a variety of applications including transportation applications, portable power sources, home and commercial power generation, large power generation and any other applications that would benefit from the use of such a system. With respect to transportation applications, fuel cells represent a promising alternative to vehicles with conventional internal combustion engines, which engines burn fossil fuels such as gasoline or diesel. Internal combustion engines produce harmful particulates and add greenhouse gases to the atmosphere. Fuel cell vehicles, on the other hand, may be fueled with pure hydrogen and emit only water and energy in the form of electric power and heat. In fact, fuel cell vehicles may be twice as efficient as conventional vehicles.

Typically, fuel cells create energy through a chemical process that converts hydrogen fuel and oxygen into water, producing electricity and heat in the process. Fuel cells operate very much like a battery with constantly renewed reactants. While batteries are recharged using electricity, fuels cells are recharged using hydrogen and oxygen. A fuel cell stack uses the hydrogen supplied by the fuel source to produce electricity to power any device including one or more electric motors, which motors move a vehicle. A fuel cell stack may consist of hundreds of individual fuel cells. In many cases, a battery is used to store electricity produced by the fuel cell stack and by other systems in the vehicle, such as regenerative braking systems. The energy stored in the battery may also be used to power the electric motors as well as additional electrical systems in the vehicle.

Unlike a battery that is limited to the stored energy it holds, a fuel cell is capable of generating energy as long as fuel is supplied. While battery electric vehicles use electricity from an external source stored in the battery, fuel cell vehicles create their own electricity. Fuel cells are also capable of providing a greater energy density or current density than conventional batteries for electric vehicles, allowing larger amounts of energy to be produced continuously. This may allow fuel cell vehicles to be equipped with more sophisticated and powerful electronic systems than those found in current gasoline powered vehicles. For example, an increase in the number of control sensors in a vehicle may improve handling and braking systems, making vehicles safer.

Hydrogen used in cells as a fuel may be produced from a fossil fuel such as natural gas, methanol etc. through a reforming process. The hydrogen produced by the reforming process is not pure, lowering the efficiency of the fuel cell. Adding a reformer to convert hydrocarbon fuel into hydrogen drops the overall efficiency of the fuel cell to about 30 to 40 percent.

Therefore there exists a need in the art to find effective and efficient ways to constantly produce and store hydrogen in a fuel cell in order to provide continuous operation. Still further, what is needed is a rechargeable fuel cell system that derives energy from an internal source and stores it within the system.

BRIEF SUMMARY OF THE INVENTION

In one aspect, a dual mode electrochemical system comprises a first electrode capable of storing hydrogen, a second electrode, a substantially electrically insulating and substantially ionically conducting membrane interposed therebetween and an electrolyte. In a first mode, upon introduction of water and electricity the dual mode electrochemical system electrolyzes the water in the presence of the electrolyte and produces hydrogen and oxygen across the membrane. The hydrogen is stored within the first electrode. In a second mode, upon introduction of an oxidant to the second electrode the dual mode electrochemical system produces water and electricity by reacting the stored hydrogen and the oxidant across the membrane.

In yet another aspect, a dual mode electrochemical system comprises an anode capable of storing hydrogen. The anode comprises at least one of a conductive polymer, a ceramic, a metal, a metal hydride, an organic hydride, a binary composite, a binary-ternary composite, a nanocomposite and a carbon nanostructure. The dual mode electrochemical system further comprises a cathode, a substantially electrically insulating and substantially ionically conducting membrane interposed between the anode and the cathode, and an electrolyte. In a charging mode upon introduction of water and electricity the dual mode electrochemical system electrolyzes the water in the presence of the electrolyte and produces hydrogen and oxygen across the membrane and the hydrogen is stored within the anode. In a discharge mode upon introduction of an oxidant to the cathode, the dual mode electrochemical system produces water and electricity by reacting the stored hydrogen and the oxidant across the membrane.

In yet another aspect, a dual mode electrochemical system comprises an anode capable of storing hydrogen, a cathode; a substantially electrically insulating and substantially ionically conducting membrane interposed between the anode and the cathode. The dual mode electrochemical system further comprises a catalyst disposed adjacent to the membrane and an electrolyte. In a charge mode upon introduction of water and electricity, the dual mode electrochemical system electrolyzes the water in the presence of the electrolyte and produces hydrogen and oxygen across the membrane and the hydrogen is stored within the anode. In a discharge mode upon introduction of an oxidant to the cathode the dual mode electrochemical system produces water and electricity in presence of the catalyst by reacting the stored hydrogen and the oxidant across the membrane.

In yet another aspect, a method of charging and discharging a dual mode electrochemical system comprises introducing water and electricity into the dual mode electrochemical system and producing hydrogen and oxygen across an electrically insulating and substantially ionically conducting membrane interposed between a first electrode and an second electrode. The method further comprises storing hydrogen in the first electrode and introducing an oxidant into the second electrode. The hydrogen and the oxidant react across the membrane thereby producing water and electricity.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 2 is an illustration of reactions for charging and discharging a solid-state hydrogen storage anode material in accordance with an exemplary embodiment of the present technique;

DETAILED DESCRIPTION OF THE INVENTION

As required, detailed embodiments of the present invention are disclosed herein. However, it is to be understood that the disclosed embodiments are merely exemplary of the invention that may be embodied in various and alternative forms. Specific structural and functional details disclosed herein are not to be interpreted as limiting, but merely as a basis for the claims as a representative basis for teaching one skilled in the art to variously employ the present invention. Throughout the drawings, like elements are given like numerals.

Figure 1:
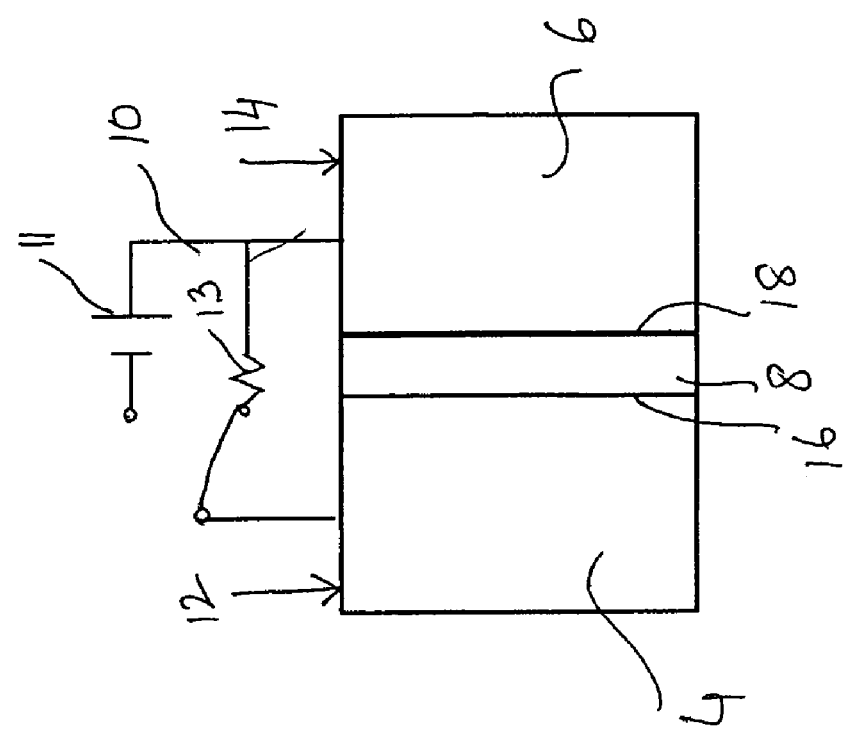
FIG. 1 is a schematic diagram of an exemplary dual mode electrochemical system.

FIG. 1 illustrates an exemplary dual mode electrochemical system 2 comprising a first electrode 4 capable of storing hydrogen and a second electrode 6. A substantially electrically insulating and ionically conducting membrane 8 is disposed between the first electrode 4 and the second electrode 6. The electrochemical system 2 further comprises an electrolyte. In the dual mode operation, the electrochemical system 2 operates in a first mode and a second mode. In operation, during the first mode of the electrochemical system 2, water 12 and electricity are added to the electrochemical system. In some embodiments, the electricity may be supplied through an external circuit 10. The external circuit comprises a charging circuit 11 and a load 13. The dual electrochemical system 2 electrolyzes water 18 in the presence of the electrolyte and produces hydrogen and oxygen across the membrane 8. The hydrogen produced in the electrolysis process is stored in the first electrode 4. The first mode of the dual electrochemical system 2 is generally referred to as the charging mode where hydrogen is produced and stored in the first electrode 4. In the second mode of operation, the dual mode electrochemical system 2 operates as a fuel cell, wherein upon introduction of an oxidant 14, the stored hydrogen reacts with the oxidant 14 across the membrane 8 to chemically react to produce water and electricity. Therefore in the first mode or the charging mode the dual mode electrochemical system works in principle like an electrolyzer, wherein water is split into hydrogen and oxygen by applying electricity in presence of an electrolyte. However, in the second mode or the discharge mode, the dual mode electrochemical system works as a fuel cell, wherein hydrogen and oxygen react to form water and electricity.

In some embodiments, the first electrode 4 is an anode and the second electrode 6 is a cathode. In all the embodiments disclosed herein, the first electrode 4 is referred to as anode and the second electrode 6 is referred to as cathode for the purpose of clarity of understanding. In an exemplary embodiment, as shown in FIG. 1, the membrane 8 comprises two sides, an anode side 16 and a cathode side 18. The electrolyte is absorbed into the membrane 8.

The dual mode electrochemical system disclosed herein applies to power generation in general, transportation applications, portable power sources, home and commercial power generation, large power generation and any other application that would benefit from the use of such a system. The disclosed dual mode electrochemical system may be used for small portable devices including but not limited to laptop computers, mobile phones and other similar devices.

The first electrode 4 comprises hydrogen storage material, which first electrode 4 performs multiple functions: (1) a solid-state hydrogen source and the anode for the fuel cell during the discharging mode; and (2) an active electrode for the electrolyzer during the charging mode.

In the dual mode electrochemical system 2, the first electrode 4 has storage characteristics characterized by being capable of accepting electrical energy, typically direct-current (DC) electric energy, in a charging mode to convert the solid-state material of the first electrode to a hydrogen-rich form, thereby retaining the energy in the form of chemical energy. In the discharge mode, the dual mode electrochemical system 2 releases stored energy upon a demand, which dual mode electrochemical system 2 operates as a fuel cell. The material for the hydrogen-storing first electrode is selected based on its capability to repeatedly perform these modes of operations over a reasonable life cycle based on its rechargeable properties. The electrical energy may be supplied from an external source, a regenerative braking system, as well as any other source capable of supplying electrical energy. The solid-state material of the first electrode 4 may be recharged with hydrogen by applying the external voltage and water. In one embodiment, the dual mode electrochemical system may also be charged using gaseous hydrogen. By utilizing this design, a truly rechargeable fuel cell is realized without the need for a separate hydrogen source.

One difference between the charging mode and discharging mode is that in the charging mode a certain amount of chemical energy is stored, whereas in the discharging mode, the electrochemical device will continue to produce electrical power output as long as a fuel and oxidant are supplied thereto. The oxidants that can be used in this process include any gas stream comprising oxygen. In some embodiments, air is used as the oxidant to react with hydrogen to produce water in the discharging mode.

Hydrogen and oxygen are required by the dual mode electrochemical system to produce electrical energy. Hydrogen contains more chemical energy per weight than any hydrocarbon fuel. The electrochemical system disclosed herein is operated with solid-state materials capable of hydrogen storage, including, but not limited to, conductive polymers, ceramics, metals, metal hydrides, organic hydrides, a binary or other types of binary/ternary composites, nanocomposites, carbon nanostructures, hydride slurries and any other material having hydrogen storage capacity.

Solid-state hydrogen storage materials provide substantial improvements in energy density compared to liquid or compressed gas and are ideal for transportation applications. In operation, unlike conventional fuel cells that require refilling of the hydrogen fuel, the fuel in the dual mode electrochemical systems disclosed herein is also recoverable by electrical recharging. The hydrogen fuel is stored in a solid-state material, making it safe to handle and store. The solid-state fuel has two simultaneous functions, energy storage and energy generation. In this case, the output energy density is dependent on its energy storage capacity. In other words, the generation of electrical power is coupled to the storage of energy.

The solid-state materials that are suitable to be used as an anode should typically be able to absorb large amounts of hydrogen (depending on the desired use of the dual mode electrochemical system), and the material should also maintain a high-degree of structural integrity and have good hydrogen absorption characteristics over multiple charge/discharge cycles. In other words, the structural integrity should not affect capacity and the solid-state material should exhibit high stability over multiple cycles of hydrogen absorption.

In one embodiment, metal hydrides are used as an anode in the disclosed dual mode electrochemical system. The metal hydride material typically provides multiple functions: (1) a solid-state hydrogen storage source and the anode for the fuel cell during the discharging mode; and (2) an active electrode for the electrolyzer during the charging mode.

In some embodiments, the anode material is selected from the group consisting of metal hydrides of $AB_5$ alloy, $AB_2$ alloy, AB alloy, $A_2B$ alloy and $AB_3$ alloy. The $AB_5$ ally includes, but not limited to $LaNi_5$, $CaNi_5$, and $MA_xB_yC_z$, wherein M is a rare earth element component, A is one of the elements Ni and Co, B is one of the elements Cu, Fe and Mn, C as one of the elements Al, Cr, Si, Ti, V and Sn, and x, y and z satisfy the following relations, wherein $2.2 \leq x \leq 4.8$, $0.01 \leq y \leq 2.0$, $0.01 \leq z \leq 0.6$, $4.8 \leq x+y+z \leq 5.4$. Typical examples of $AB_2$ include, but are not limited to Zr—V—Ni, Zr—Mn—Ni, Zr—Cr—Ni, TiMn, and TiCr. Typical AB type alloys include, but are not limited to TiFe and TiNi. Typical $A_2B$ type alloys include, but are not limited to $Mg_2Ni$. Typical $AB_3$ type alloys include, but are not limited to $LaNi_3$, $CaNi_3$, and $LaMg_2Ni_9$. In some embodiments, the anode material comprises catalyzed complex hydrides including, but not limited to borides, carbides, nitrides, aluminides, and silicides. Typical examples of complex catalyzed hydrides are alanates such as $NaAlH_4$, $Zn(AlH_4)_2$, $LiAlH_4$ and $Ga(AlH_4)_3$ and borohydrides such as $Mg(BH_4)_2$, $Mn(BH_4)_2$ and $Zn(BH_4)_2$. In some other embodiments, the anode material comprises nanotubes such as carbon nanotubes and BN nanotubes. In some embodiments, the anode materials comprises conducting polymers such as polypyrrole and polyanilin.

Hydrides typically store about 1 to about 18 percent hydrogen by weight and have high volumetric storage densities, higher than liquid or gaseous hydrogen. Solid-state storage materials may be chosen based upon weight, hydrogen capacity, rate of hydrogen absorption/desorption, temperature of hydriding/dehydriding, pressure of hydriding/dehydriding, and cyclic stability. The membrane 8 may comprise materials that can electrically isolate the first electrode 4 and the second electrode 6. And it also provides ionic pathways for electrolyte. In addition, the membrane material should be chemically compatible with any electrolyte used in the dual mode electrochemical system 2. The membrane 8 may comprise materials including, but not limited to polyethylene (PE) and polypropylene (PP), polytetrafluoroethylene (PTFE), modified PE, modified PP, PP derivatives, PE derivatives, polystyrene, polyimide, polyvinylidene resin, and combinations thereof. The electrolytes that may be used in the dual mode electrochemical system include water, acid, sodium hydroxide (NaOH), potassium hydroxide (KOH), lithium hydroxide or a mixture thereof. Inorganic salts, such as $Na_2SO_4$, $K_2SO_4$, $KNO_3$, $NaNO_3$, NaCl. KCl, CsOH, $H_2SO_4$, HCl, $CH_3COOH$, $H_3PO_4$, HCOOH, $HClO_4$ may also be used as an electrolyte.

Referring to FIG. 2, two electrochemical reactions (R), R1 and R2 take place in the charging mode of the dual electrochemical system described herein. In operation, during the charging mode, electricity is applied through an external circuit. M (typically a rare earth metal) reacts with water and the electrons to form metal hydride NH at the anode and forms hydroxyl ions, $OH^-$. At the cathode, oxygen is produced from the hydroxyl ions in the electrolyte. The oxygen is vented into the atmosphere from the cathode or alternatively, oxygen is collected in a vessel and then recycled back to the cathode in the discharging mode. The water produced by the dual mode electrochemical system in the discharging mode may be recycled, through a recycling channel back into the anode, where it is used to recharge the solid-state anode.

As illustrated in FIG. 2, in the discharge mode, hydrogen is released from the metal hydride and reacts with the oxygen to generate electricity and water, which oxygen is added during the discharge process by an oxygen-containing source. In the reaction R3, the metal hydride MH reacts with the hydroxyl ion to produce water and electrons. The water reacts with oxygen in reaction R4 and electrons are consumed to produce hydroxyl ions. In an overall reaction R5, water balance is maintained in the dual mode electrochemical systems. It should be recognized that these reactions are merely illustrative of the principles of various potential reactions. The charging and discharging of the dual mode electrochemical device may also be achieved to other reaction routes. In the charging mode, electrical energy is supplied to the dual mode electrochemical system, which system works similar to an electrolyzer. In the discharging mode, electrical energy is produced in the dual mode electrochemical system, which system works as a fuel cell.

Water has been described above as the source of hydrogen, however, water is not meant to be a limiting example of the present technique. In other examples, sources for hydrogen may include methanol, sodium borohydride, cyclohexanol and phenyl amine, among others. For longer life of the anode the water added may be filtered to removed any solids to avoid fouling. Any oxidant comprising oxygen may be used in the recharge process. In one embodiment, air is used as an oxidant. In some other embodiment, pure oxygen is used an oxidant.

Figure 3:
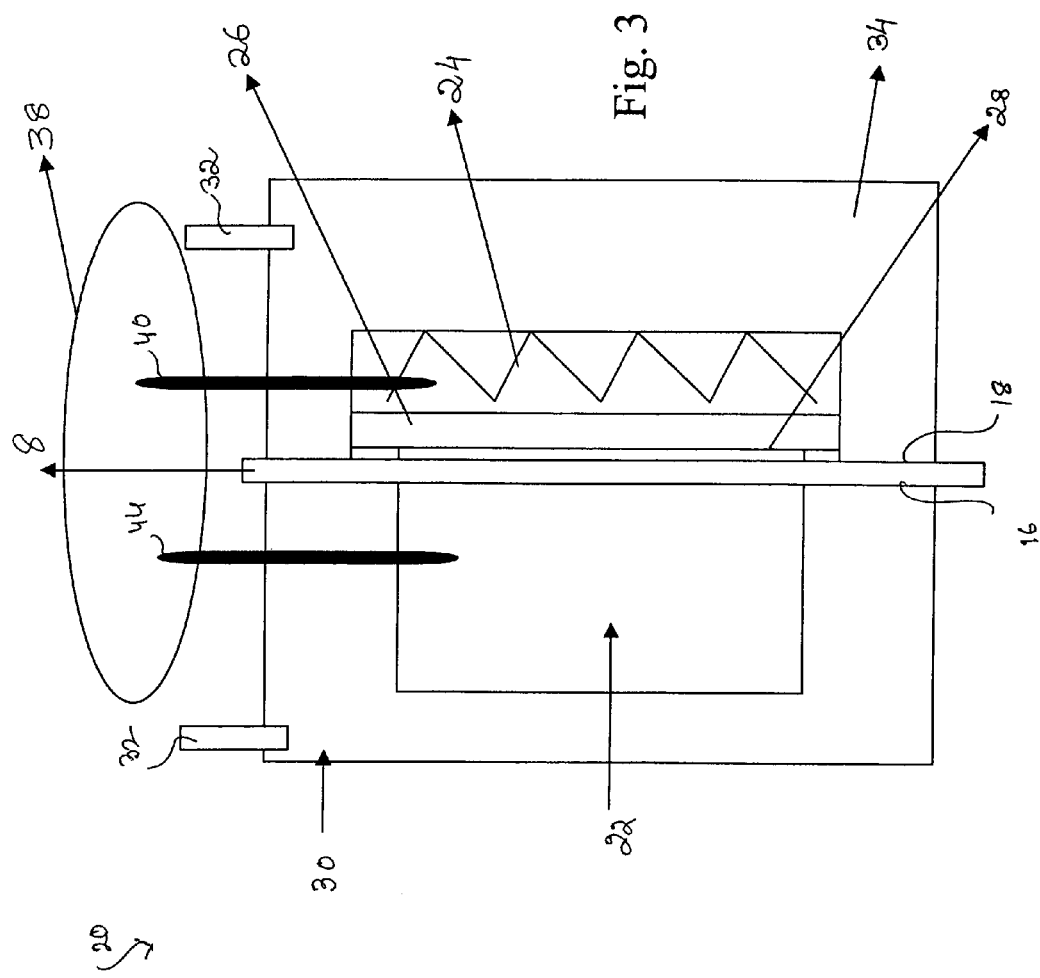
FIG. 3 is yet another exemplary dual mode electrochemical system.

FIG. 3 illustrates yet another schematic of an exemplary dual mode electrochemical system 20 in accordance with the present technique. The exemplary dual mode electrochemical system 20 comprises an anode 22 capable of storing hydrogen and a cathode 24. A substantially electrically insulating and ionically conducting membrane 8 is disposed between the anode 22 and the cathode 24. The dual mode electrochemical system 20 further comprises an electrolyte. In the dual mode operation, the dual mode electrochemical system 20 operates in a first mode and a second mode. In operation, during the first mode of the dual mode electrochemical system 20, water and electricity are added to the dual mode electrochemical system 20. The dual mode electrochemical system electrolyzes water in presence of the electrolyte and produces hydrogen and oxygen across the membrane 8. The hydrogen produced in the electrolysis process is stored in the anode 22. The first mode of the dual electrochemical system is generally referred to as the charging mode where hydrogen is produced and stored in the anode 22. In the second mode of operation, the dual mode electrochemical system 20 operates as a fuel cell wherein upon introduction of an oxidant, the stored hydrogen reacts with the oxidant across the membrane 8 to chemically react to produce water and electricity.

The exemplary dual mode electrochemical system 20 as illustrated in FIG. 3 further comprises a catalyst layer 28 adjacent to the cathode side 18 of the membrane 8. The function of the catalyst later 28 is to catalyze oxygen to produce hydroxyl ions. The catalyst layer 28 may comprise materials including but not limited to platinum, palladium, ruthenium, silver, manganese and combinations thereof. In some embodiments, the catalyst layer comprises $MnO_2$ and $La_pCa_qCoO_3$, wherein p and q are defined as $0.2 \leq p \leq 0.8$ and $0.1 \leq q \leq 0.6$. In some other embodiments, the catalyst layer comprises $LiMn_{2-r}Co_rO_4$ wherein r is defined as $0.2 \leq r \leq 1.5$. In some other embodiments, the catalyst layer comprises CaO, $Ni(OH)_2$, NiO, CoO, $KMnO_4$ and combination thereof. In the embodiments, where platinum is used as the catalyst layer, the surface of the platinum is such that a maximum amount of the surface area is exposed to oxygen. Oxygen molecules are reduced in the presence of the catalyst and accept electrons from the external circuit to produce the hydroxyl ion while reacting with hydrogen, thus forming water. In this electrochemical reaction, a potential develops between the two electrodes.

The materials used for the anode 22 are as described in the preceding sections. The cathode may comprise a material selected from a group consisting of an electrically conductive oxide, perovskite, doped LaMnO3, tin doped Indium Oxide (In2O3), Strontium-doped PrMnO3, La ferrites, La cobaltites, RuO2-YSZ, and combinations thereof. In one embodiment, the cathode is configured to have a mesh structure as shown in FIG. 3 to improve the current collection efficiency. The cathode 24 may also comprise channels etched into its surface operable for distributing oxygen to the surface of the catalyst. The dual mode electrochemical system 20 may further comprise a gas diffusion layer 26 to enhance the oxygen transfer. The anode 22 and cathode 24 may be configured to be held by structures 30 and 34, which structures are electrically conductive. In one embodiment, the structures 30 and 34 are made of carbon plates.

In operation, the anode 22 and cathode 24 provide internal flow paths for electrical current during the charging and discharging mode through a plurality of current collectors 32, which current collectors in turn connect to one or more external loads (not shown). During the discharging mode, electrons created by the electrochemical system are available and are sent via the current collectors 32 to the one or more external loads. The operating voltage across an individual system 20 may be in the order of about 1 volt. Therefore, a plurality of individual system 20 may be placed in series or in parallel in order to obtain an adequate load voltage.

Figure 4:
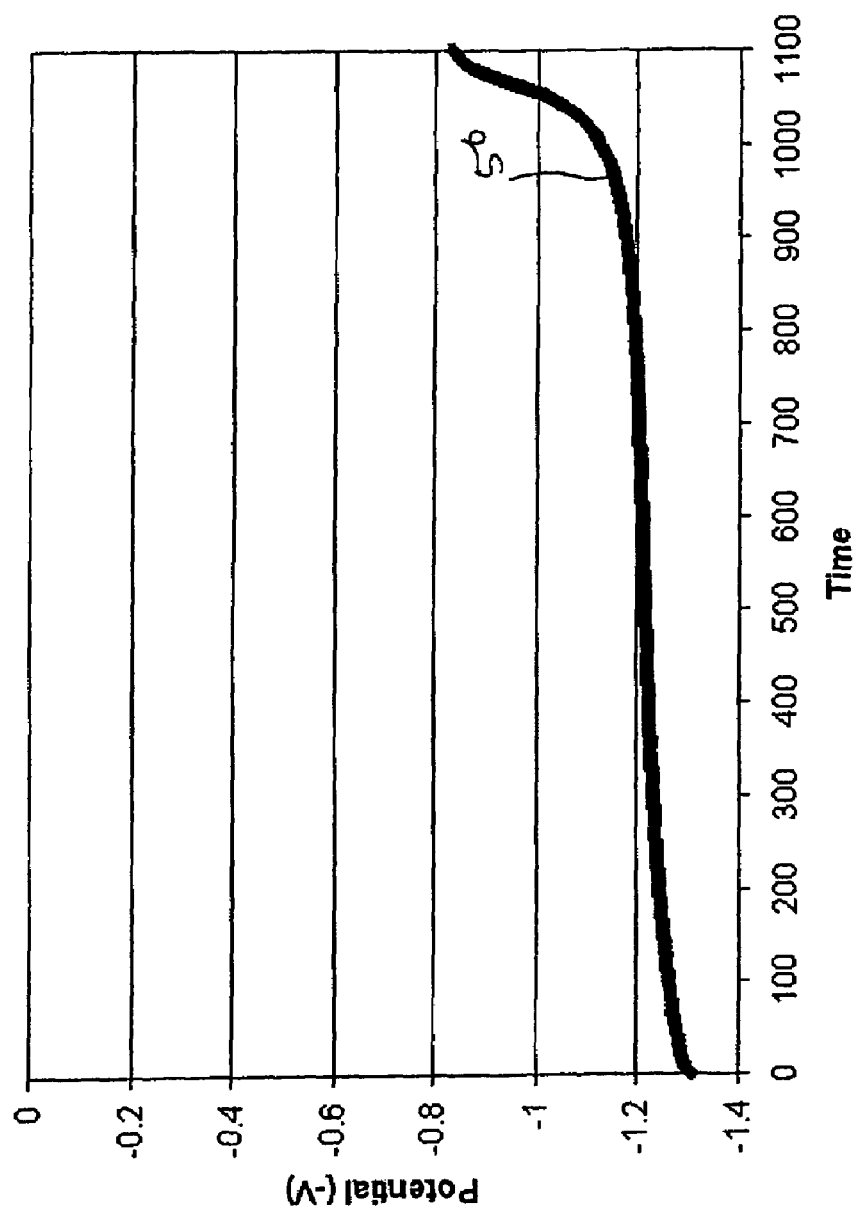
FIG. 4 is a graph showing the potential change of the dual electrochemical system in the discharging mode.

The dual mode electrochemical device may further comprise a pressure controlling system 38 as illustrated in the exemplary embodiment in FIG. 3. The pressure controlling system 38 comprises pressure measurement devices. The anode side and the cathode side are configured to have one or more pressure measurement devices that are connected to a pressure release system. The pressure measurement device may be a pressure gauge or a transducer. In some embodiments, the pressure measurement devices are connected to a pressure release system, which system may comprise a safety release device such as a valve or a rupture disc. As shown in FIG. 3, the hydrogen port 44 in the anode side and oxygen and air port 40 comprise a pressure measurement device and a release system. The pressure controlling system 38 is configured to make the dual mode electrochemical system 20 safe to handle and operate FIG. 4 illustrates the change in potential of the dual mode electrochemical device during the discharging process. The device can be discharged at high working voltage. FIG. 4 shows a sudden change in the potential at point 50 indicating that all the hydrogen stored in the metal hydride is consumed.

In accordance with the present technique, the electrochemical system 20 may be employed in transportation applications, portable power sources, home and commercial power generation, large power generation and any other application that would benefit from the use of such a system. A fuel cell vehicle may be powered by one or more electric motors that are powered by the disclosed dual mode electrochemical system.

The dual mode electrochemical systems disclosed herein can generate and store a fuel, such as hydrogen within. In charging operations, hydrogen is stored in the anode material, which hydrogen may be used and depleted during the discharging mode when the dual mode electrochemical system operates as a fuel cell. The disclosed dual mode electrochemical systems are rechargeable and can operate without any external source of hydrogen.

Various embodiments of this invention have been described in fulfillment of the various needs that the invention meets. It should be recognized that these embodiments are merely illustrative of the principles of various embodiments of the present invention. Numerous modifications and adaptations thereof will be apparent to those skilled in the art without departing from the spirit and scope of the present invention. Thus, it is intended that the present invention cover all suitable modifications and variations as come within the scope of the appended claims and their equivalents.

What is claimed is:

1. A dual mode electrochemical system comprising:
   a first electrode capable of storing hydrogen;
   a second electrode;
   a substantially electrically insulating and substantially ionically conducting membrane interposed between the first electrode and the second electrode; and
   an electrolyte;
   wherein in a first mode upon introduction of water and electricity said dual mode electrochemical system electrolyzes said water in the presence of said electrolyte and produces hydrogen and oxygen across said membrane and said hydrogen is stored by said first electrode; and in a second mode upon introduction of an oxidant to said second electrode said dual mode electrochemical system produces water and electricity by reacting said stored hydrogen and said oxidant across said membrane;
   wherein said first electrode is an anode and said second electrode is a cathode; and
   wherein said cathode comprises a material selected from a group consisting of doped $LaMnO_3$, tin doped Indium Oxide, Strontium-doped $PrMnO_3$, La ferrites, La cobaltites, and $RuO_2$-YSZ.

2. The system of claim 1, wherein the first electrode comprises hydrogen storage material.

3. The system of claim 2, wherein said hydrogen storage material is selected from a group consisting a conductive polymer, a ceramic, a metal, a metal hydride, a nanotube and combination thereof.

4. The system of claim 2, wherein said hydrogen storage material is a metal hydride.

5. The system of claim 1 further comprising a catalytic layer disposed adjacent to said membrane.

6. The system of claim 5, wherein said catalytic layer comprises a material selected from the group consisting of platinum, palladium, silver, manganese, ruthenium, and a combination of two or more thereof.

7. The system of claim 1, wherein said electrolyte absorbs into said membrane.

8. The system of claim 1, wherein said electrolyte is an aqueous solution that includes at least one salt that is selected from the group consisting of $Na_2SO_4$, $K_2SO_4$, $KNO_3$, $NaNO_3$, NaCl, KCl, CsOH, $H_2SO_4$, HCl, $CH_3COOH$, $H_3PO_4$, HCOOH, and $HClO_4$.

9. The system of claim 1, wherein said membrane is chemically compatible with said electrolyte.

10. The system of claim 1, wherein said membrane comprises a material selected from the group consisting of polytetrafluoroethylene, polypropene, polyethene, modified polyethene, modified polypropene, polypropene derivatives, polyethene derivatives, polystyrene, polyimide, polyvinylidene resin, and a combination of two or more thereof.

11. The system of claim 1 further comprising one or more current collectors, said current collector is adapted to provide internal flow paths for said electricity.

12. The system of claim 11, wherein said current collectors comprise an electrically conducting material.

13. The system of claim 1, wherein said electricity in said first mode is supplied by an internal voltage source, an external voltage source, or a regenerative braking system.

14. The system according to claim 1 further comprising a pressure control system for controlling pressures of said hydrogen and oxygen in said electrochemical device.

15. The system of claim 1, wherein, oxygen and water are recycled in said system.

16. The system of claim 1, wherein said electrochemical system is employed in transportation applications, residential applications, commercial and industrial facilities, portable power sources, laptop, mobile phones and large-scale power generation applications.

17. The system of claim 1, wherein said oxidant is one of air or oxygen.

18. A dual mode electrochemical system comprising:

an anode capable of storing hydrogen; said anode comprising at least one of a conductive polymer, a ceramic, a metal, a metal hydride, an organic hydride, a binary composite, a binary-ternary composite, a nanocomposite and a carbon nanostructure;

a cathode, wherein said cathode comprises a material selected from a group consisting of an perovskite, doped $LaMnO_3$, tin doped Indium Oxide ($In_2O_3$), Strontium-doped $PrMnO_3$, La ferrites, La cobaltites, $RuO_2$-YSZ;

a substantially electrically insulating and substantially ionically conducting membrane interposed therebetween; and an electrolyte, wherein said electrolyte is an aqueous solution that includes at least one salt that is selected from the group consisting $Na_2SO_4$, $K_2SO_4$, $KNO_3$, $NaNO_3$, NaCl, KCl, CsOH, $H_2SO_4$, HCl, $CH_3COOH$, $H_3PO_4$, HCOOH, and $HClO_4$;

wherein in a charging mode upon introduction of water and electricity said dual mode electrochemical system electrolyzes said water in the presence of said electrolyte and produces hydrogen and oxygen across said membrane and said hydrogen is stored by said anode; and in a discharge mode upon introduction of an oxidant to said cathode, said dual mode electrochemical system produces water and electricity by reacting said stored hydrogen and said oxidant across said membrane.

19. The system of claim 18, wherein said hydrogen storage material is a metal hydride.

20. The system of claim 18, wherein said electrolyte absorbs into said membrane.

21. The system of claim 18, wherein said membrane is chemically compatible with said electrolyte.

22. The system of claim 18, wherein said oxidant is one of air or oxygen.

* * * * *